(No Model.)
A. T. BROWN.
VEHICLE TIRE.
No. 474,589. Patented May 10, 1892.
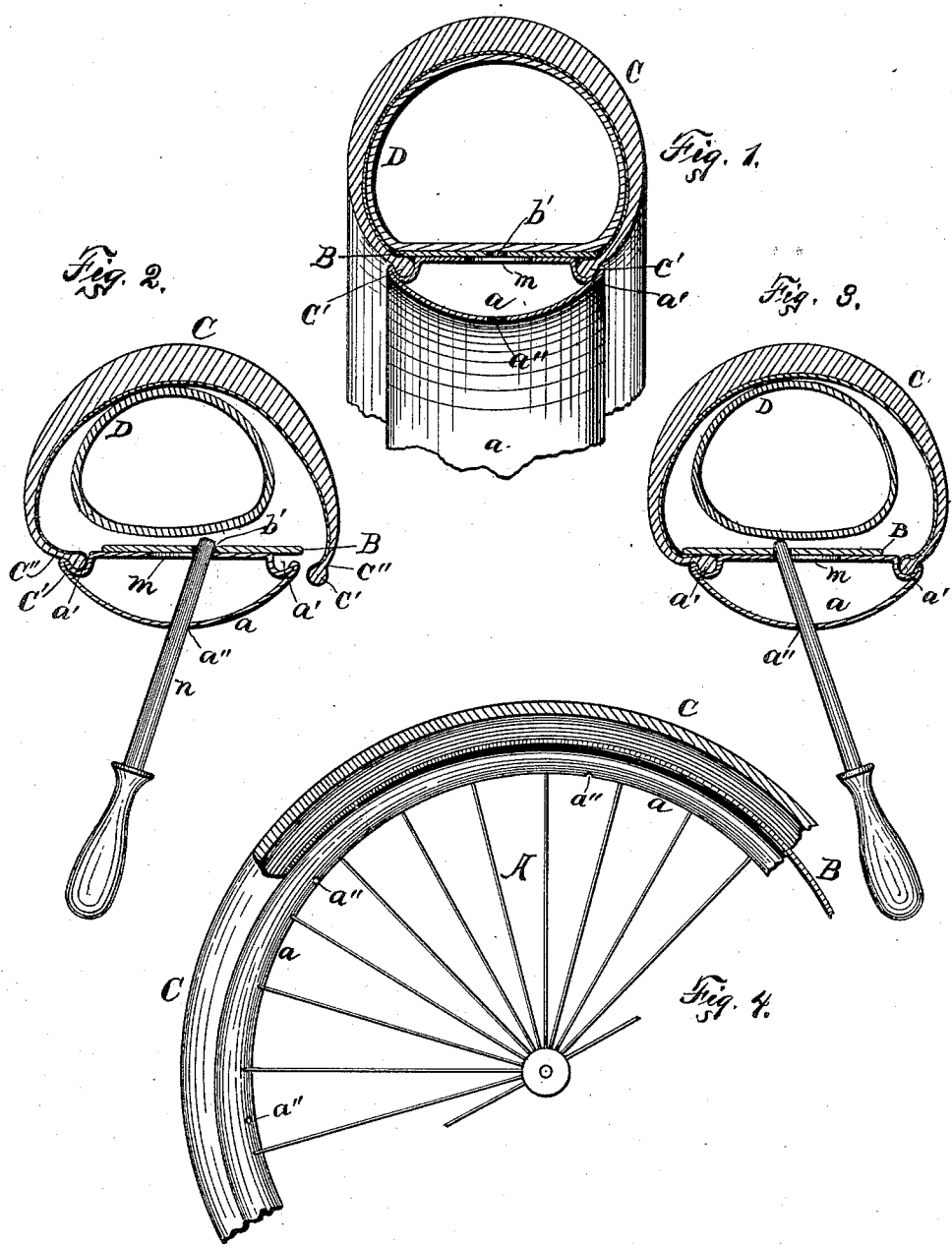
WITNESSES:
H. A. Carhart
C. B. Kinne
INVENTOR,
Alexander T. Brown
BY
Smith & Denison
his ATTORNEYS

UNITED STATES PATENT OFFICE.

ALEXANDER T. BROWN, OF SYRACUSE, NEW YORK.

VEHICLE-TIRE.

SPECIFICATION forming part of Letters Patent No. 474,589, dated May 10, 1892.

Application filed September 21, 1891. Serial No. 406,290. (No model.)

*To all whom it may concern:*

Be it known that I, ALEXANDER T. BROWN, of Syracuse, in the county of Onondaga, in the State of New York, have invented new and useful Improvements in Vehicle-Tires, of which the following, taken in connection with the accompanying drawings, is a full, clear, and exact description.

My invention relates to vehicle-tires, and more particularly to those of bicycles or velocipedes.

My object is to produce an elastic or cushion tire which can be readily applied to or removed from the rim or felly of the wheel and which is securely locked upon said rim when in use either with or without a pneumatic sack within it, the edges of the tire being enlarged and fitting in concave seats in the lateral edges of the rim and being held therein by a band, which encircles the rim and normally partially or nearly closes the seats in the rim, thus inclosing the enlarged edges of the tire.

My invention consists in the several novel features of construction and operation hereinafter described, and which are specifically set forth in the claims hereunto annexed. It is constructed as follows, reference being had to the accompanying drawings, in which—

Figure 1 is a transverse section of the tire, the pneumatic sack inflated within it, the rim, and the locking-band. Fig. 2 is a like view of the same parts not inflated and showing the band pushed to one side to permit one edge of the tire to be forced into its seat and the other edge out of its seat. Fig. 3 is a like view of the same parts, showing the band pushed to the opposite side from that shown in Fig. 2 and the other edge just seated or ready to be removed. Fig. 4 is an elevation of part of a wheel, partly sectional.

A is the wheel, provided with a rim or felly $a$, convex inwardly, provided with edge-concavities $a'$ and with a plane or substantially plane surface between said concavities, which constitutes the outer face of the rim.

B is a band of metal fitting loosely around the rim and somewhat wider than the outer face thereof, so that its edges overlap the inner edges of said concavities $a'$.

C is the tire, constructed of rubber, with a canvas or cloth lining, thickened centrally and of substantially the concavo-convex form shown and having its lateral edges enlarged or thickened, as at $c'$, creating a neck $c''$ adjacent to each enlargement. These enlargements are of the same form as the concavities $a'$ in which they are seated.

D is a pneumatic tube, of any desired construction, placed within the tire. At regular intervals the inner face of the rim is perforated, as at $a''$. The outer face of the rim is slotted transversely, said slots $m$ being opposite or in line with the perforations $a'$. At like intervals and in like alignment with these perforations and slots the band B is provided with apertures $b'$, so that when a bar $n$ is inserted through a perforation and slot and into one of said apertures then that portion of said band adjacent thereto can be pushed to one side or the other, as shown in Figs. 2 and 3.

In Fig. 2 the band is shifted to the right, which opens part of the concave seat $a'$ on that side to receive the enlarged edge of the tire. Then passing clear around, shifting the band, and inserting the edge of the tire that whole edge is inserted. Then pushing the band clear over to the left, as in Fig. 3, and moving around from one perforation to another and shifting the band the whole of the right edge of the tire is inserted into its seat $a'$. Then pushing the band back to the center, as in Fig. 1, both of its edges will overlap the enlarged edges and fit substantially against the necks $c''$ on each side. Then when the previously-inserted pneumatic tube is inflated it will lock the band upon the tire and the band will lock the edges of the tire, as shown in Fig. 1. It is preferable to have the enlarged edges of the tire of a diameter somewhat less than that of the seats $a'$ therefor in the rim, requiring them to be forced over into said seats, where they will then fit closer and more or less elastically. To remove the tire, I empty the pneumatic sack and reverse the operation of putting it on.

What I claim as my invention, and desire to secure by Letters Patent, is—

1. In a vehicle-wheel, a plano-convex rim provided with edge-concavities and perforated and slotted, as shown, in combination with a band fitting around said rim and perforated at intervals, and a tire having thickened edges locked in the rim-concavities by said band, and a pneumatic sack inflated within said tire.

2. The combination, with a vehicle-tire crescent-shaped in cross-section and having thickened side edges, of a plano-convex rim formed with concave side edges for the reception of the thickened edges of the tire and a band fitting around the plane of the rim and adapted to be moved sidewise to lock both thickened edges in their respective seats.

3. In a vehicle-wheel, the combination, with a rim formed with concave edges, of a hollow tire having thickened edges adapted to be seated in said concave edges, a pneumatic sack within the tire, and a band fitting around said rim and adapted to be manipulated to lock said thickened edges in their respective seats and unlock the same through the medium of holes in the rim.

4. A vehicle-tire crescent-shaped in cross-section and having thickened edges adapted to be seated in the concave side edges of a rim, in combination with a continuous band adapted to be shifted sidewise to lock or fasten said thickened edges in their respective seats.

In witness whereof I have hereunto set my hand this 16th day of September, 1891.

ALEXANDER T. BROWN.

In presence of—
HOWARD P. DENISON,
C. W. SMITH.